Oct. 23, 1945.　　J. P. GODLEWSKI　　2,387,255
FISHING LURE
Filed June 25, 1943
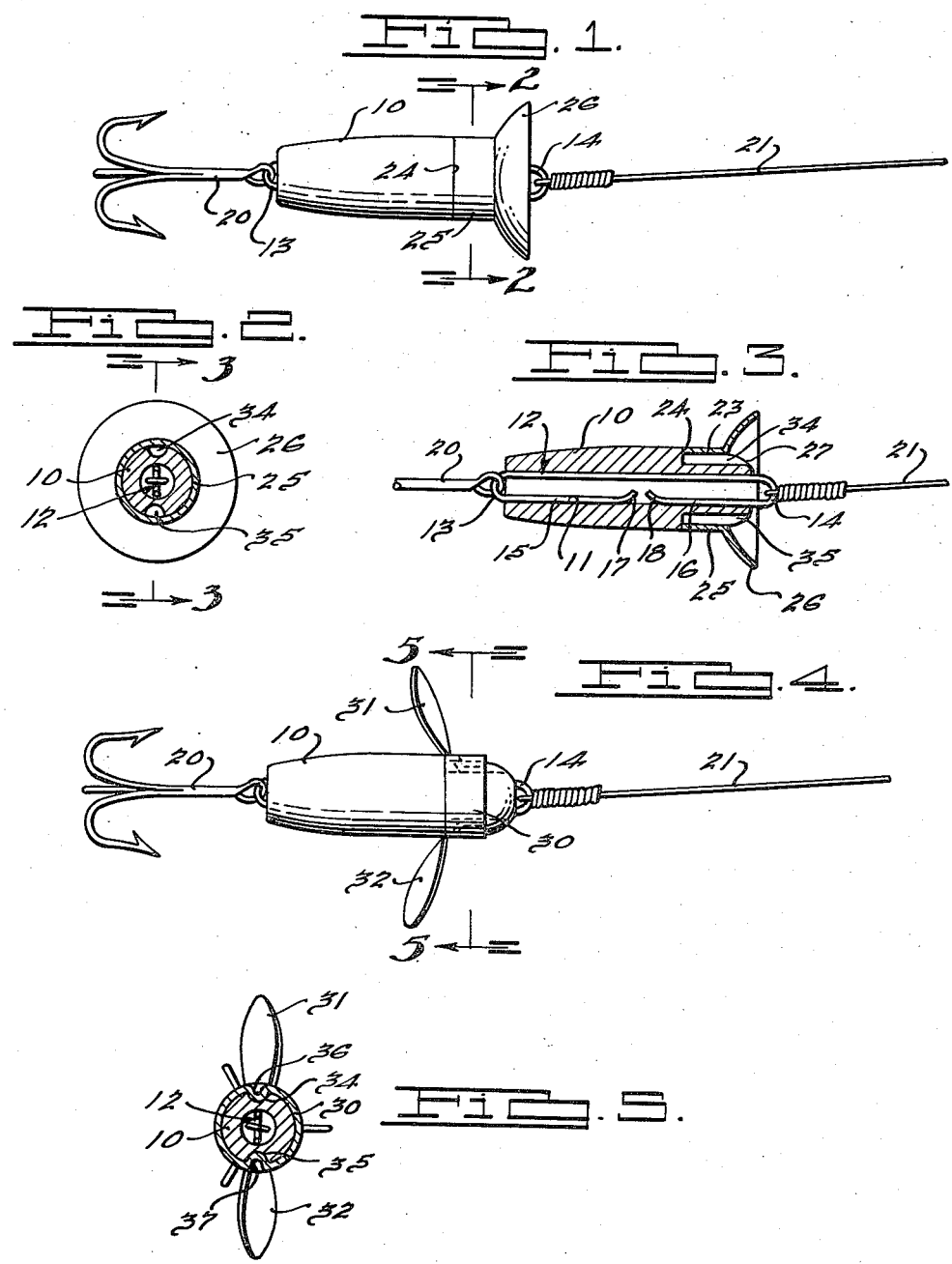
INVENTOR.
John P. Godlewski.
BY
Harness, Dickey & Pierce.
ATTORNEYS Patented Oct. 23, 1945

2,387,255

UNITED STATES PATENT OFFICE 2,387,255

FISHING LURE

John P. Godlewski, Detroit, Mich.

Application June 25, 1943, Serial No. 492,235

4 Claims. (Cl. 43—46)

The invention relates generally to the art of fishing and it has particular relation to a lure to be attached to a fishing line.

One object of the present invention is to provide an improved type of fishing lure which is particularly attractive to fish so as therefore to render it easier to catch them.

Another object of the invention is to provide a fishing lure of improved character which is particularly efficient in catching fish by trolling.

Another object of the invention is to provide a fishing lure which when pulled through the water moves about in seemingly animated fashion so as to attract the fish.

Another object of the invention is to provide an improved type of fishing lure which may be manufactured inexpensively and which includes parts that may be used selectively, or, in other words, substituted one for another.

Other objects of the invention will become apparent from the following specification, from the drawing relating thereto, and from the claims hereinafter set forth.

For a better understanding of the invention, reference may be had to the drawing wherein:

Figure 1 is a side view of a fishing lure constructed according to one form of the invention;

Figure 2 is a cross-sectional view taken substantially along the line 2—2 of Figure 1;

Figure 3 is a longitudinal-sectional view taken substantially along the line 3—3 of Figure 2;

Figure 4 is a view similar to Figure 1 but illustrating a modified form of the invention; and Figure 5 is a cross-sectional view taken substantially along the line 5—5 of Figure 4.

Referring to Figures 1, 2, and 3, the lure comprises an elongated body 10 which may be constructed of wood, plastic, or similar material. This body is generally cylindrical in character at its center, but tapers to a smaller outside diameter at that end to which a hook is to be attached. At its center, the body has a longitudinally extending opening 11 of substantial size and this opening receives a wire element 12 which is reversely bent at opposite ends as indicated at 13 and 14 with the reversing ends extending back into the opening as indicated at 15 and 16 respectively. The extreme ends of the reversely bent portions are bent slightly as indicated at 17 and 18 in order to facilitate insertion of the looped wire into the opening from either end. The loops are of such size and the wire is so bent that the latter has substantial frictional engagement with the sides of the opening so that looseness is avoided and that normally the parts remain as assembled.

At the left end of the body as seen in Figure 3, a multiple type fish hook 20 is connected to the loop 13 while the opposite loop 14 is connected to a flexible fish line indicated at 21. It will be observed that even with the wire in place, water may flow through the opening.

Around that end opposite the hook, the body has a generally cylindrical surface 23 which is slightly smaller in diameter and this surface terminates in a shoulder 24. An annular band or collar 25 fits over the surface 23 in a rather tight but removable manner and this collar has at its outer end a concavo-convex disc portion 26 with the concave side next to the fish line 21. The collar and disc portion may be removed by manual pull and applied by frictionally sliding the collar over the surface 23 until the end of the collar engages the shoulder 24. The collar may be made of plastic, aluminum, copper, brass, etc. and its color as well as that of the body may vary as desired.

During trolling, when the fish line is being pulled and moved through the water, the disc portion 26 tends to cause water to be drawn into the concavity and this produces a little extra pressure which relieves itself at the first opportunity. Due to whirling of water, currents, etc., which will inevitably be present as the line is pulled and moved through the water, the water inside the disc pushes on the latter repeatedly and often and forces the disc laterally in varying directions, and, as a result, the lure flops about and moves quickly and repeatedly from one side to another in different directions transversely of the line and thereby appears extremely animated. This action is somewhat influenced and affected by the end surface of the body indicated at 27 and also the opening in the body tends to modify the action and perhaps to prevent undesirable amounts of movement laterally. In any event, the general result is a lure which moves back and forth in different lateral directions so as to produce apparent animation. This attracts fish and usually a fish is caught as it attempts to catch the lure from behind and thereby to swallow the lure hook-end first.

The modified form of the invention shown by Figures 4 and 5 comprises the same body, but in this case a collar 30 is provided which has wings or blades 31 and 32 disposed in balanced relation and oppositely directed. As shown by Figure 5, the body has opposite grooves 34 and 35 receiving respectively inwardly pressed beads 36 and 37 on the collar, so that the collar is locked against rotation relative to the body. When this lure is pulled through the water, the blades cause it to rotate and hence the appearance is one of animation also but in a different way.

It is to be observed that the body shown in Figure 3 also has grooves 34 and 35 and the parts are designed so that the collar and disc element shown in Figure 3 may be used selectively and alternately with the collar 30 and blades shown in Figure 5. In the one case, it is desired particularly that the blades not be rotatable on the body so as to be certain that the lure will turn with the blades. In the other case, the collar and disc normally will not turn and the frictional engagement with the surface 23 is sufficient. Either element may be readily substituted for the other merely by manually pulling one off of the body and pressing the other onto the body in place thereof. It might be added that this substitution may be readily effected, if desired, by pulling the wire and line through the body from the hook end until the hook can be disengaged from the wire and then reversely pulling the line until the wire is removed from the front end.

Although more than one form of the invention has been illustrated and described in detail, it will be apparent to those skilled in the art that various modifications may be made without departing from the scope of the appended claims.

What is claimed is:

1. A fish lure comprising a body having an opening therethrough, a wire element extending through the opening and being reversely looped at both ends with the reversing parts projecting back into the opening, a hook fastening to the wire loop at one end of the opening, a fish line connected to the loop at the other end, an annular collar on the body at that side opposite the hook, and water resistant means projecting outwardly from the collar, said reversing parts extending substantially into the opening and pressing against the side thereof so as to frictionally hold the element in place.

2. A fish lure comprising an elongated body, a hook fastened to the body at one end, an annular collar encircling and being secured on the other end of the body, a water resisting means projecting outwardly from the collar for influencing action of the lure as it is pulled through the water and comprising a concavo-convex disc centered on the collar, and a fish line connected to the lure at the end oppositie the hook for pulling the lure through the water.

3. A fish lure comprising an elongated body, a hook fastened to the body at one end, an annular collar encircling and being secured on the other end of the body, a water resisting means projecting outwardly from the collar for influencing action of the lure as it is pulled through the water, and a fish line connected to the lure at the end opposite the hook for pulling the lure through the water, said collar having an inwardly directed element disposed in a keyway in the body so that the collar may be slidably applied and locked against rotation.

4. A fish lure comprising an elongated body having an opening extending longitudinally therethrough, a concavo-convex disc disposed transversely of and fastened to one end of the body with the disc center on the latter and having an opening in line with the body opening, the disc having its convex side facing towards the opposite end of the body, and a fish line connected to the lure at the end having the disc fastened thereto.

JOHN P. GODLEWSKI.